(12) United States Patent
Drew et al.

(10) Patent No.: US 6,450,580 B1
(45) Date of Patent: Sep. 17, 2002

(54) VEHICLE SEAT

(75) Inventors: Mike Drew, Wavendon (GB); Bernd Schmidt, Wildberg (DE); Ralf-Henning Schrom, Rottenburg (DE); Volkmar Schulz, Weitransdorf (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/520,976

(22) Filed: Mar. 8, 2000

(30) Foreign Application Priority Data

Mar. 8, 1999 (DE) .......................................... 199 10 083

(51) Int. Cl.$^7$ ................................................. B60N 2/20
(52) U.S. Cl. .............................. 297/378.12; 297/378.1; 297/362.13; 297/301.2
(58) Field of Search ........................ 297/378.12, 378.1, 297/362.13, 301.2

(56) References Cited

U.S. PATENT DOCUMENTS

| | | | | |
|---|---|---|---|---|
| 2,321,385 A | * | 6/1943 | Herold | 297/300.5 |
| 3,090,647 A | * | 5/1963 | Moore | 297/307 |
| 3,519,240 A | * | 7/1970 | Swenson | 248/573 |
| 3,580,635 A | * | 5/1971 | Posh | 297/362.13 |
| 3,765,720 A | * | 10/1973 | Sakai | 297/330 |
| 3,822,914 A | * | 7/1974 | Iida et al. | 297/362.13 |
| 3,866,270 A | * | 2/1975 | Suzuki et al. | 16/324 |
| 4,353,594 A | * | 10/1982 | Lowe | 297/307 |
| 4,565,404 A | * | 1/1986 | Rauschenberger | 297/19 |
| 4,606,577 A | * | 8/1986 | Hirama et al. | 297/331 |
| 5,383,709 A | * | 1/1995 | Chaney et al. | 297/302 |
| 5,547,252 A | * | 8/1996 | Pfenniger | 297/300.3 |
| 5,732,423 A | * | 3/1998 | Weismiller et al. | 5/425 |

FOREIGN PATENT DOCUMENTS

| | | |
|---|---|---|
| DE | 38 01 294 A1 | 7/1989 |
| DE | 38 13 594 A1 | 11/1989 |
| DE | 41 36 363 A1 | 5/1993 |
| DE | 39 34 171 C2 | 6/1995 |

* cited by examiner

*Primary Examiner*—Peter M. Cuomo
*Assistant Examiner*—Joseph Edell
(74) *Attorney, Agent, or Firm*—Crowell & Moring LLP

(57) ABSTRACT

A motor vehicle seat has a base element which can be fastened in the motor vehicle, a seat element which is disposed on the base element, and a backrest element which is disposed on the seat element. The seat can be adjusted between a locked position and an unlocked position. In the locked position, the seat element and the backrest element can be used for normal sitting. In the unlocked position, the seat element and/or the backrest element are adjusted in the vehicle to the front with respect to the driving direction far enough so that a space arranged behind the seat with respect to the driving direction is accessible for loading and unloading. For adjustment between the locked position and the unlocked position, the seat element is swivellably disposed on the base element and/or the backrest element is swivellably disposed on the seat element. In order to reduce stress on the seat during a restoring movement from the unlocked position to the locked position, damper devices are provided in order to counteract the restoring movement at least during its end phase.

15 Claims, 1 Drawing Sheet

VEHICLE SEAT

This application claims the priority of German application 199 10 083.7, filed Mar. 8, 1999.

BACKGROUND AND SUMMARY OF THE INVENTION

The present invention relates to a seat for a motor vehicle, particularly for a passenger car, having a base element which can be fastened in the motor vehicle, a seat element which is disposed on the base element, and a backrest element which is disposed on the seat element. The seat is adjustable between a locked position, in which the seat element and the backrest element can be used for normal sitting, and an unlocked position. In the unlocked position, at least one of the seat element and the backrest element is adjusted in the vehicle to the front with respect to the driving direction sufficiently far that a space arranged behind the seat with respect to the driving direction is accessible for loading, unloading, entry and exit. The seat element is swivellably disposed on the base element for adjusting the seat between the locked position and the unlocked position. Damper devices counteract, in a damping manner, a restoring movement of the seat from its unlocked position into its locked position.

A front passenger seat of this type for a bus is known from German Patent Document DE 38 01 294 A1. This known seat comprises forward frame legs which are fixed to the vehicle body and on which a seat element is swivellably disposed. In addition, a backrest element is swivellably disposed on the seat element. In order to be able to open up the entrance area of the bus for entry and exit, the seat can be adjusted between a locked position, in which the seat element and the backrest element can be used for normal sitting, and an unlocked position, in which the seat element and the backrest element are adjusted forward in the vehicle with respect to the driving direction. Damper devices in the form of gas pressure springs are provided between the forward frame legs and the seat element in order to facilitate forward displacement of the seat. During return displacement of the seat from its unlocked position into its locked position, these damper devices counteract the restoring movement of the seat in a correspondingly damping manner.

In this known seat, the backrest as well as the seat element must be displaced and secured in a corresponding position. Consequently, a complex and high-expenditure locking mechanism is required for the backrest and the seat element. Such a complex locking mechanism requires relatively high operating and control expenditures, for example, to determine whether the seat is properly locked in the in-use position.

A rear seat for a motor vehicle which can be moved from an in-use position into a not-in-use position is known from German Patent Document DE 41 36 363 A1. For this purpose, the seat element is swivelled about a swivelling axis, which is arranged on an end situated away from the backrest, before the backrest can be brought about a swivelling axis provided in its lower area into a horizontal position. The seat element and the backrest are connected with one another by way of gas pressure springs which, in a damping manner, counteract movements of the seat from the in-use position into the not-in-use position and vice versa.

Finally, each of the seats known from German Patent Document DE 39 34 171 C2 as well as from German Patent Document DE 38 13 594 A1 has a seat element and a backrest element disposed thereon. Normally, such a seat is also equipped with a base element which can be fastened in the motor vehicle and on which the seat element is disposed. The known seats can be adjusted between a locked position and an unlocked position. In the locked position, the seat element and the backrest element can be used for normal vehicle occupant sitting. In the unlocked position, the backrest element is adjusted in the vehicle with respect to the driving direction toward the front so that a space arranged behind the seat with respect to the driving direction, such as the rear space, is accessible for loading or unloading and entry and exit of rear occupants. In order to be able to adjust the seat between its locked position and its unlocked position, the backrest element is in this case swivellably disposed on the seat element.

In the last mentioned seats, spring devices in the form of elastic components are arranged between the backrest element and the seat element. A flexible buffer or a compression-elastic elastomer part constructed as a rubber part or a soft-plastic part, in particular, may be used. These spring devices have the purpose of bracing, in the locked position of the seat, the backrest element with respect to the seat element such that relative movements between these elements and thus noise development are prevented.

It is an object of the present invention to reduce the operating expenditures when displacing the seat back into its locked position while a comfortably damped restoration of the seat into position is maintained.

According to the invention, this object is achieved by a seat in which the damper devices are dimensioned such that, during a restoring movement, the seat, because of its weight, is automatically adjusted into its locked position. The restoring movement of the seat is damped during an end phase until the locked position is reached. Advantageous embodiments with expedient further developments of the invention are reflected in the claims.

In order to increase comfort of the seat according to the invention, the restoring movement of the seat is damped during an end phase until the locked position is reached. As a result of this measure, the kinetic energy of the seat during the restoring adjustment is converted into frictional or thermal energy. The damping effect, that is, the damper forces counteracting the restoring movement, depend on the speed of the restoring movement so that higher restoring speeds cause correspondingly higher damper forces. The corresponding seat components, such as a locking mechanism, are therefore protected. As a result, the operational safety of the vehicle can also be improved. As the end phase of the restoring movement, that is, the part of the restoring path damped by the damper devices becomes longer, the kinematic energy of the seat becomes lower and slamming of the seat into its locked position can be better prevented by damper devices.

Furthermore, in a seat according to the invention, the damper devices are dimensioned such that, during the restoring movement, because of its weight, the seat is automatically adjusted into its locked position. The operating expenditures of the seat are therefore reduced because the need for the vehicle occupant to check as to whether the seat has reached its locked in-use position is eliminated. This is particularly significant if the seat has an automatically operating locking device which secures the seat as soon as it has reached its locked position.

In one preferred embodiment, the damper devices can be constructed as piston-cylinder units which may be constructed as gas pressure springs or as oil pressure dampers.

Such damper devices, which are known per se, permit, the damped end phase of the restoring movement to be constructed so as to be particularly large. Furthermore, such damper devices are relatively reasonably priced, have been successful in practice, and can be designed in a relatively simple manner for the forces to be controlled at the seat.

In a further development of the seat according to the invention, locking devices may be provided which automatically lock the seat when its locked position is reached. These locking devices may then have a swivel bow which can be swivellably adjusted about a swivel shaft between a holding position, in which it reaches, by way of a bow part, over a projection which is necessarily also adjusted by the adjusting movement of the seat between its locked position and its unlocked position, and a release position, in which it releases the projection. The damper devices, which in this case are constructed as piston cylinder units for damping the restoring movement, can then extend through between the bow part of the bow situated in its release position and the swivel shaft and can be supported on the projection. As a result, a compact construction, which permits favorable lever ratios for the introduction of force of the dampers, is obtained.

Additional important characteristics and advantages of a seat according to the invention are reflected in the claims, the drawings, and the description of the figures shown in the drawings.

It is to be understood that the characteristics mentioned above and the characteristics yet to be explained can be used not only in the particularly described combination but also in other combinations or alone, without departing from the scope of the present invention.

BRIEF DESCRIPTION OF THE DRAWINGS

Preferred embodiments are illustrated in the drawings and will be explained in detail in the following description.

DESCRIPTION OF THE PREFERRED EMBODIMENTS

Figure 1:
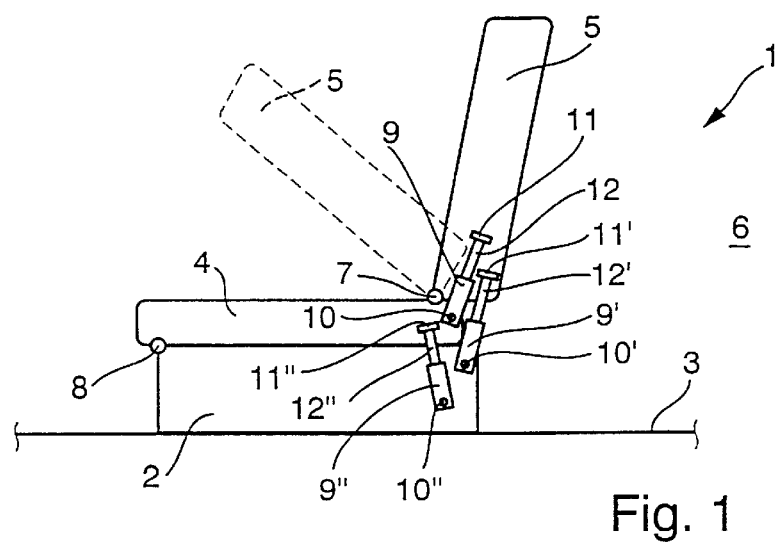
FIG. 1 is a schematic, very simplified, lateral view of a seat constructed according to the invention.

FIG. 1 shows a vehicle seat 1, particularly a front seat of a passenger car, which has a base element 2 which is fastened on a vehicle floor 3 of a vehicle which is otherwise not shown. The seat 1 also has a seat element 4 which is disposed or held in a conventional manner on the base element 2. In addition, the seat 1 has a backrest element 5 which is also disposed or held in a conventional manner on the seat element 4.

In a two-door passenger car, in order to make accessible a rear space 6 which, with respect to the driving direction, is situated behind the seat 1, the seat 1 can be adjusted between a locked position and an unlocked position. In the locked position, which is illustrated in FIG. 1 by solid lines, the seat 1, in a manner provided for this purpose, can be used by a vehicle occupant for sitting. In the unlocked position, the backrest element 5 is swivellably adjusted toward the seat element 4, as illustrated in FIG. 1 by broken lines. For this purpose, the backrest element 5 is swivellably disposed in a conventional manner at a swivel location indicated by reference number 7 on the seat element 4. In another embodiment, the seat 1 can also take up its unlocked position when the seat element 4 is swivelled toward the front in the driving direction. For this purpose, the seat element 4 can be swivellably disposed at a swivel location indicated by reference number 8 on the base element 2. Likewise, a combination of a swivelling adjustment of the seat element 4 and a swivelling adjustment of the backrest element 5 is conceivable. In addition, the base element 2 can permit adjustment of the seat 1 in the driving direction in order to additionally improve the access to the rear space 6.

A suitable locking device is provided at the seat 1 and the vehicle floor 3 and anchors the seat 1 in its locked position on the vehicle floor 3. By way of such a locking device, the backrest element 5 is locked into place at the seat element 4 or at the base element 2, and/or the seat element 4 is locked into place at the base element 2. Because such locking devices are known, they will not be described here. They are also not shown in FIG. 1 for reasons of clarity.

The seat 1 according to the invention is equipped with a damper device 9, which is constructed here as a piston cylinder unit, particularly as a gas pressure spring or as an oil pressure damper. The gas pressure spring 9 is linked at reference number 10 to the seat element 4 and is supported on a contact part 11 constructed on the backrest element 5. During an end phase of a restoring movement, which changes the seat 1 and the backrest element 5 from the unlocked position to the locked position, a piston rod 12 of the piston cylinder unit 9 interacts with the contact part 11. In this case, the damper device 9 is arranged such that it transmits damper forces counteracting this restoring movement from the seat element 4 to the backrest element 5, so that the backrest element 5 is braked corresponding to the damping.

According to a construction of the seat 1 corresponding to another embodiment, a damper device 9' can be linked at reference number 10' to the base element 2 as well and, by way of its piston rod 12', can be supported on a contact part 11', also on the backrest element 5. In this case, the damper device 9' dampens swivelling adjustments about the bearings 7 and/or 8. In another embodiment, a damper device 9" can be disposed at reference number 10" on the base element 2 as well, but may be supported by way of its piston rod 12" on a contact part 11", which is then constructed on the seat element 4. In this case, the damper device 9" dampens swivelling adjustments about the bearing 8.

Because of the restoring movement of the seat 1 or, in this case, of the backrest element 5, the damper device 9 is moved from an initial position, in which its piston rod 12 has maximally moved out, into an end state, in which the piston rod 12 has maximally moved in. The damper devices 9 may have spring devices here, which are not shown, or may interact with spring devices, with spring forces which are in parallel to the damper forces of the damper devices 9. The spring devices are coupled with the damper devices 9 such that the spring devices prestress the damper devices 9 in their initial states.

Figure 2:
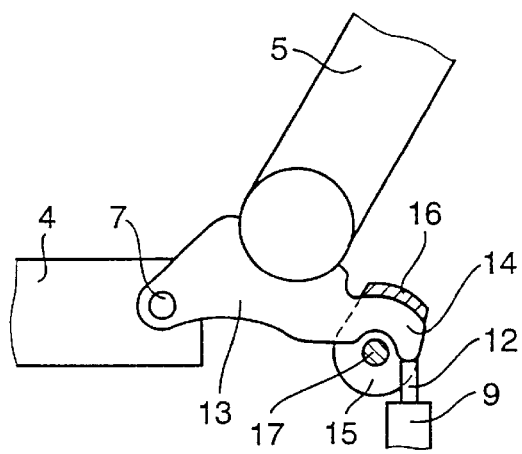
FIG. 2 is a schematic view of a portion of the seat according to the invention in the area of a locking device, while the seat is in a locked position.
Figure 3:
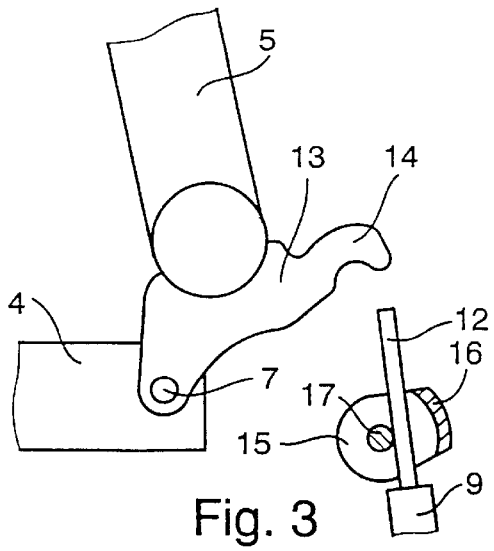
FIG. 3 is a view similar to FIG. 2 but with the seat in an unlocked position.

In another embodiment of the seat 1 according to the invention, and referring to FIGS. 2 and 3, the backrest element 5 is also swivelled with respect to the seat element 4 in order to adjust the seat 1 between its locked position illustrated in FIG. 2 and its unlocked position illustrated in FIG. 3. For the swivel bearing of the backrest element 5, the latter is equipped with a corresponding fitting 13 which is swivellably disposed at a location designated by the reference number 7 on the seat element 4. In an area facing away from the bearing 7, a projection 14 is constructed on the fitting 13 and projects in a finger-type manner away from the driving direction and forms a part of a locking device of the seat 1. For locking the seat 1 and the backrest element 5 in the locked position, the projection 14 interacts with a swivel bow 15 such that a bow part 16 of the swivel bow 15 reaches over the projection 14; in this case, the swivel bow 15 takes a holding position.

For releasing the seat 1 and the backrest element 5, the swivel bow 15 is swivellably adjusted about a swivel shaft 17 into a release position indicated in FIG. 3.

In this embodiment, the damper device 9 is arranged in a particularly space-saving manner. The piston rod 12 of the piston cylinder unit 9 acting as the damper device extends through between the swivel shaft 17 and the bow part 16 as long as the swivel bow 15 is in its release position. During the restoring adjustment of the seat 1 and of the backrest element 5, the projection 14 comes in contact with the axially free end of the piston rod 12, so that the backrest element 5 can be supported on the damper device 9. The contact point between the piston rod 12 and the projection 14 is preferably selected such that, in this phase of the restoring movement, the backrest element 5 has not yet taken up very high kinetic energy, so that the damper device 9 does not have to absorb particularly high forces. In this case, the damper device 9 is dimensioned such that the weight of the seat or, in this case, of the backrest element 5 is sufficient for carrying out the restoring movement to the locked position. During this restoring movement, the piston rod 12 moves into the damper device 9, which is constructed, for example, as a gas pressure spring. As soon as the seat 1 or the backrest element 5 reaches the locked position, components of the locking device, which are not shown, cause an automatic swivelling of the swivel bow 15 into its holding position in order to form-lockingly secure the locked position of the seat 1.

As long as the projection 14 is situated outside the swivel bow 15, the piston rod 12 can extend between the swivel shaft 17 and the bow part 16, so that the swivel bow 15 is secured in its release position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A seat for a motor vehicle comprising:
   a base element, which can be fastened in the motor vehicle,
   a seat element, which is disposed on the base element,
   a backrest element which is disposed on the seat element, the seat being adjustable between a locked position, in which the seat element and the backrest element can be used for normal sitting, and an unlocked position, in which at least one of the seat element and the backrest element is adjusted in the vehicle to the front with respect to the driving direction sufficiently far that a space arranged behind the seat with respect to the driving direction is accessible for loading, unloading, entry and exit, the seat element being swivellably disposed on the base element for adjusting the seat between the locked position and the unlocked position, and
   a piston cylinder unit which counteracts a restoring movement of the seat from the unlocked position into the locked position,
   wherein the piston cylinder unit is dimensioned such that, during the restoring movement, the seat, because of the weight of the seat, is automatically adjusted into the locked position, the restoring movement of the seat being damped during an end phase until the locked position is reached.

2. The seat according to claim 1, wherein the piston cylinder unit is constructed as one of a gas pressure spring and an oil pressure damper.

3. The seat according to claim 1, wherein, during the end phase of the restoring movement, the piston cylinder unit is supported on the base element and on the seat element.

4. The seat according to claim 1, wherein the piston cylinder unit is mounted on the base element and is supported for damping on the seat element, or wherein the piston cylinder unit is mounted on the seat element and is supported for damping on the base element.

5. The seat according to claim 1, and further comprising a locking device which, when the locked position of the seat is reached, automatically locks the seat, wherein said locking device has a swivel bow movable about a swivel shaft between a holding position, in which the swivel bow reaches, by way of a bow part, over a projection, and a release position, in which said swivel bow releases the projection, and wherein the piston cylinder unit, for damping the restoring movement, extends through between the bow part of the swivel bow situated in the release position and the swivel shaft and is supported on the projection.

6. A seat for a motor vehicle comprising:
   a base element, which can be fastened in the motor vehicle,
   a seat element, which is disposed on the base element,
   a backrest element which is disposed on the seat element, the seat being adjustable between a locked position, in which the seat element and the backrest element can be used for normal sitting, and an unlocked position, in which at least one of the seat element and the backrest element is adjusted in the vehicle to the front with respect to the driving direction sufficiently far that a space arranged behind the seat with respect to the driving direction is accessible for loading, unloading, entry and exit, the backrest element being swivellably disposed on the seat element for adjusting the seat between the locked position and the unlocked position, and
   a piston cylinder unit which counteracts a restoring movement of the seat from the unlocked position into the locked position,
   wherein the piston cylinder unit is dimensioned such that, during the restoring movement, the seat, because of the weight of the seat, is automatically adjusted into the locked position, the restoring movement of the seat being damped during an end phase until the locked position is reached.

7. The seat according to claim 6, wherein the piston cylinder unit is constructed as one of a gas pressure spring and an oil pressure damper.

8. The seat according to claim 6, wherein, during the end phase of the restoring movement, the piston cylinder unit is supported on the base element and on the backrest element or on the seat element and on the backrest element.

9. The seat according to claim 6, wherein the piston cylinder unit is mounted on the base element and is supported for damping on the backrest element, wherein the piston cylinder unit is mounted on the backrest element and is supported for damping on the seat element or on the base element, or wherein the piston cylinder unit is mounted on the seat element and is supported for damping on the backrest element.

10. The seat according to claim 6, and further comprising a locking device which, when the locked position of the seat is reached, automatically locks the seat, wherein said locking device has a swivel bow movable about a swivel shaft between a holding position, in which the swivel bow reaches, by way of a bow part, over a projection, and a release position, in which said swivel bow releases the projection, and wherein the piston cylinder unit, for damping the restoring movement, extends through between the bow part of the swivel bow situated in the release position and the swivel shaft and is supported on the projection.

11. A seat for a motor vehicle comprising:
   a base element, which can be fastened in the motor vehicle,
   a seat element, which is disposed on the base element,
   a backrest element which is disposed on the seat element, the seat being adjustable between a locked position, in which the seat element and the backrest element can be used for normal sitting, and an unlocked position, in which at least one of the seat element and the backrest element is adjusted in the vehicle to the front with respect to the driving direction sufficiently far that a space arranged behind the seat with respect to the driving direction is accessible for loading, unloading, entry and exit, the seat element being swivellably disposed on the base element and the backrest element being swivellably disposed on the seat element for adjusting the seat between the locked position and the unlocked position, and
   at least one piston cylinder unit which counteracts a restoring movement of the seat from the unlocked position into the locked position,
   wherein each piston cylinder unit is dimensioned such that, during the restoring movement, the seat, because of the weight of the seat, is automatically adjusted into the locked position, the restoring movement of the seat being damped during an end phase until the locked position is reached.

12. The seat according to claim 11, wherein each piston cylinder unit is constructed as one of a gas pressure spring and an oil pressure damper.

13. The seat according to claim 11, wherein, during the end phase of the restoring movement, each piston cylinder unit is supported on the base element and on the seat element, on the base element and on the backrest element, or on the seat element and on the backrest element.

14. The seat according to claim 11, wherein the at least one piston cylinder unit is mounted on the base element and is supported for damping on one of the seat element and the backrest element, wherein the at least one piston cylinder unit is mounted on the backrest element and is supported for damping on the seat element or on the base element, or wherein the at least one piston cylinder unit is mounted on the seat element and is supported for damping on one of the backrest element and the base element.

15. The seat according to claim 11, and further comprising a locking device which, when the locked position of the seat is reached, automatically locks the seat, wherein said locking device has a swivel bow movable about a swivel shaft between a holding position, in which the swivel bow reaches, by way of a bow part, over a projection, and a release position, in which said swivel bow releases the projection, and wherein each piston cylinder unit, for damping the restoring movement, extends through between the bow part of the swivel bow situated in the release position and the swivel shaft and is supported on the projection.

* * * * *